United States Patent [19]

van Wingerden

[11] Patent Number: 4,926,587
[45] Date of Patent: May 22, 1990

[54] METHOD AND APPARATUS FOR PROPAGATING PLANTS

[76] Inventor: Aart van Wingerden, Hwy. 191, Rte. 1, Box 74A, Horse Shoe, N.C. 28742

[21] Appl. No.: 341,254

[22] Filed: Apr. 18, 1989

Related U.S. Application Data

[63] Continuation of Ser. No. 933,741, Nov. 2, 1986, abandoned.

[51] Int. Cl.$^5$ ............................ A01G 9/02; A01G 9/10
[52] U.S. Cl. ............................................. 47/85; 47/87; 47/77
[58] Field of Search ................... 47/66, 73, 74, 77, 85, 47/86, 87; 111/2, 3

[56] References Cited

U.S. PATENT DOCUMENTS

| | | | |
|---|---|---|---|
| Re. 29,248 | 6/1977 | Congleton | 47/77 |
| 1,169,674 | 1/1916 | Pelton | 47/85 |
| 3,432,027 | 3/1969 | Mueller | 47/73 |
| 3,447,261 | 6/1969 | Hundt | 47/85 |
| 3,515,036 | 6/1970 | Oki et al. | 47/85 |
| 3,825,126 | 7/1974 | Pohl et al. | 47/86 |
| 3,986,299 | 10/1976 | Merzweiler | 47/87 |
| 3,987,956 | 10/1976 | Congleton | 47/85 |
| 4,006,558 | 2/1977 | Neddo et al. | 47/86 |
| 4,050,188 | 9/1977 | van Wingerden | 47/85 |
| 4,057,932 | 11/1977 | Spencer | 47/85 |
| 4,197,674 | 4/1980 | Blackmore | 47/73 |
| 4,213,274 | 7/1980 | Skaife | 47/86 |
| 4,248,014 | 2/1981 | Williames | 47/73 |
| 4,434,576 | 3/1984 | Sowerwine | 47/73 |

FOREIGN PATENT DOCUMENTS

| | | | |
|---|---|---|---|
| 195653 | 9/1986 | European Pat. Off. | 47/86 |
| 1141482 | 12/1962 | Fed. Rep. of Germany | 47/85 |
| 3232594 | 4/1984 | Fed. Rep. of Germany | 47/73 |
| 897165 | 1/1982 | U.S.S.R. | 47/77 |
| 493730 | 10/1938 | United Kingdom | 47/85 |
| 666355 | 2/1952 | United Kingdom | 47/85 |
| 8300078 | 1/1983 | World Int. Prop. O. | 47/85 |

*Primary Examiner*—Danton D. DeMille
*Attorney, Agent, or Firm*—David M. Carter

[57] ABSTRACT

A method and apparatus for propagating plants is illustrated wherein provision is made for aeration and drainage of the root plug with increased air flow to the upper or leafy parts of the plants extending across a growing tray in a predetermined pattern. Provision is also made for filling the compartments of a growing tray with growing medium in a predetermined pattern to permit air flow across the tray from the bottom. Provision is also made to support strips forming a growing tray permitting horizontal movement of the strips as well as rows of compartments containing the plants, and a shelf is provided in the strips or partitions of the trays extending for a limited distance over a minor area of the compartments to confine the growing medium within the trays while permitting insertion of a member for pushing the plant upwardly from the bottom out of the respective growing containers.

1 Claim, 6 Drawing Sheets

Fig. 12-A.

METHOD AND APPARATUS FOR PROPAGATING PLANTS

This is a continuation of co-pending application Ser. No. 06/933,741 filed on Nov. 21, 1986 now abandoned.

BACKGROUND OF THE INVENTION

This invention relates to seedlings and other small plants, seedling trays and method of propagation of plants.

In the propagation of seedlings and other growing plants, efforts have been made to provide strips which, when utilized with other similar strips in pairs, form trays having rows of compartments for accommodating the root plug or root ball of a growing plant prior to transplanting same for further growth. Such strips are illustrated in U.S. Pat. Nos. 4,050,188 and 4,453,344. U.S. Pat. No. 3,515,036 illustrates a growing container or tray wherein respective rows of compartments are hinged at each end. French Patent No. 1,307,886 of 1962 illustrates the use of hinges in connection with rows of compartments formed into a tray or block. U.S. Pat. No. 4,006,558 illustrates the use of a two piece corrugated container having an inwardly tapering lower portion for confining growing material through a wedging action.

The apparatus and methods contemplated herein make provision for growing a plant having an aerated root ball or plug utilizing a vertical slot opening. Provision is made for surrounding the individual growing compartments with an opening or openings to provide for air pruning of the root systems as well as air flow to the bottoms of the leafy portion of the plants while making possible aeration of the root system.

Accordingly, it is an important object of the present invention to provide for aeration and drainage of the root systems of seedlings and other small plants through the use of compartments having vertical openings therein, and surrounding such respective compartments with additional openings providing air pruning of the root systems at the vertical openings as well as air to the leafy top portions of the plants.

Another important object of the present invention relates to horizontal movement of strips illustrated in the form of generally sinuous barriers which form rows of growing compartments so as to move the plants away from adjacent plants of the growing trays to avoid damage especially to the tops of the plants during their removal from the tray preparatory to transplanting. It is advantageous to hinge the ends of each of the pairs of strips forming growing compartments as such hinges facilitate such horizontal movement one at a time manually with support of the strips or in pairs especially if a machine is to be utilized to remove the young plants for transplanting. The strips may advantageously not be hinged but may be removed horizontally in pairs one row at a time while supported for subsequent pushing up of the plants from the bottom of the compartments while lifting same from the top as may be carried out by a machine or partially manually as illustrated.

Another object of the invention is the provision of apparatus for facilitating the filling of a tray with a growing medium. This is preferably accomplished utilizing a template or other form of barrier having an opening therein limiting entrance of the growing material to those compartments or areas of the trays where such is desired.

The injected molded plastic strips as well as a tray formed from integrally connected strips as illustrated contemplate the use of shelves or inwardly tapering wedge portions formed at an acute angle extending inwardly over a minor portion of the area of the growing compartments at the bottom in order to retain the growing medium within the growing compartments.

A table is provided having openings therein permitting raising and lowering of a frame for confining the individual strips which comprise the hinged or unhinged embodiments of the invention is illustrated. The frames which support and contain the strips of the hinged and unhinged versions may be lowered within the openings of the table leaving the plants contained within the block or strips on the table for easy separation of the strips for removing the plants from the strips one row at a time.

An integral tray is provided with a groove or labyrinth between respective compartments and adjacent openings for aeration and drainage and which permits upward flow of air about the respective compartments.

Another object of the invention is the provision of strips forming rows of compartments which may be formed into a tray such that each compartment is substantially surrounded by air with the compartments occupying the greater area of the tray conserving space while accomplishing the objects of the invention.

SUMMARY OF THE INVENTION

It has been found that aeration of the root ball or root system of seedlings and other young plants may be accomplished by providing growth compartments with a vertical opening permitting air flow while excluding light to the extent that root growth is facilitated and whereby air pruning may be provided as a result of exposure to air in the absence of substantial moisture when the roots attempt to grow beyond the confines of the vertical opening. The vertical slot provides for the escape of excess moisture via draining into an empty chamber and via evaporation due to air flow in the adjacent empty chamber along the adjacent contact surfaces between strips during watering of the plant assuring proper moisture while preventing impoundment of water as would damage the root systems. Resulting root systems grow predominantly downward and outwardly throughout the growing medium being air pruned without the usual problem of root ringing.

The micro-environment of each of the plants is further enhanced through the provision for air flow upwardly from the bottom of the trays containing growth compartments or otherwise across the trays and the lower foliage or leafy top portions of the plant providing supplemental carbon dioxide or carbon dioxide from the air flow to prevent leaf yellowing and to facilitate growth. Also, provision of air flow increases plant hardening or acclimation to an outdoor environment after transplanting; provides less favorable climate for plant pathogen growth; and provides for overall less stress on the plant so there are fewer potential disease infection points present. The provision of the aforesaid micro-environment is facilitated through the use of opposed pairs of elongated molded plastic strips which form rows of growing compartments for the plants as trays or blocks. The resulting plants are exceptionally healthy and advanced in growth and are characterized by flat laterally extending root systems as illustrated in the drawings. The laterally extending root systems have a vertical planer orientation with the individual roots extending somewhat randomly outwardly and downwardly, having been formed as in the contact spaces between strips or otherwise in such vertical slots as formed thereby in the presence of air and moisture but without growth medium.

The trays may be filled with a growing medium utilizing a template having patterned openings therein for receiving a growing medium into predetermined compartments while excluding growing medium from the openings which surround the growing compartments. A shelf or ledge extends inwardly for a limited distance of approximately 1/16 to ⅛ of an inch across the lower portion of each of the growing compartments to help confine growing medium forming plugs or root balls for the plants. The open bottom is almost as wide as the opening at the tops of the compartments providing a large evaporative surface. As described above the adjacent strips forming respective rows of growing compartments may be hinged at their ends or they may be otherwise joined or accommodated within an injection molded plastic frame which provides spaced vertical supports at the bottom while encompassing the strips to confine them in blocks or trays.

The strips may be of such construction that interior compartments are formed between the respective growing compartments of lesser dimension so as to provide for the desirable air flow and aeration of root balls while minimizing lost area for plant growth. The connecting portions of the strips between the compartments may form a rectangular section or opening which bears against flat portions forming the compartments of adjoining strips as illustrated.

The constructions described above may be formed into integral molded trays wherein the ends of the strips are connected as well as transverse strips provided for utilizing vertical grooves forming labyrinths for aeration of the root ball while providing air flow entirely about the respective compartments.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a growing tray constructed of molded plastic components for propagating plants having upper portions and root systems in a growing medium having a plurality of rows of growing compartments A for containing a growing medium. The compartments are spaced across the growing tray in a predetermined pattern. A plurality of rows of openings B in the tray are located between the growing compartments defining the predetermined pattern of the compartments. The openings are, therefore, also spaced across the growing tray in a predetermined pattern. Thus, the growing tray may be supported in elevated position to accommodate air flow from beneath the growing tray upwardly through the openings facilitating growth of the upper portions of the plants. Elongated upright openings C are disposed in the growing compartments providing oxygen to the growing medium and the root systems contained therein. Hinges D may be provided at the ends of the rows of growing compartments permitting limited horizontal movement as well as support for the rows of plants. A template having an opening E affords access to growing medium for filling growing compartments in a predetermined pattern for surrounding each compartment with a flow of air. A frame F contains strips in a block or tray and supports the strips from the bottom.

Figure 1:
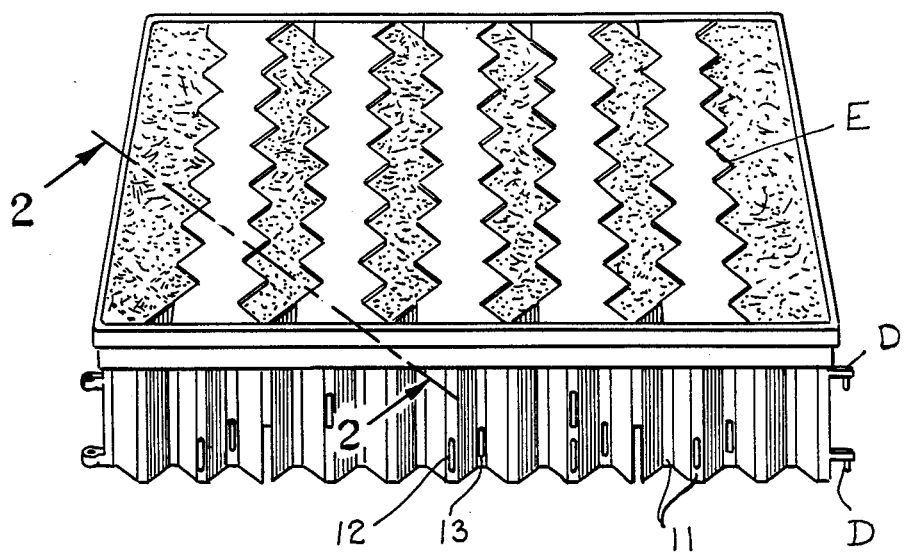
FIG. 1 is a perspective view illustrating the use of a template having patterned openings therein to limit entry of growing medium into predetermined patterns of compartments.
Figure 2:
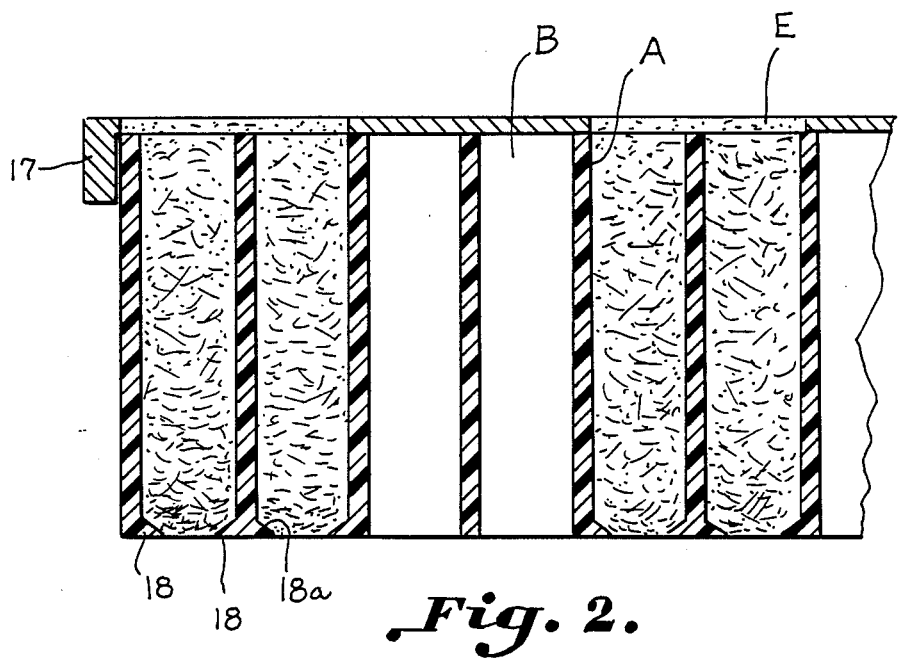
FIG. 2 is an enlarged sectional elevation taken on the line 2—2 in FIG. 1.
Figure 3:
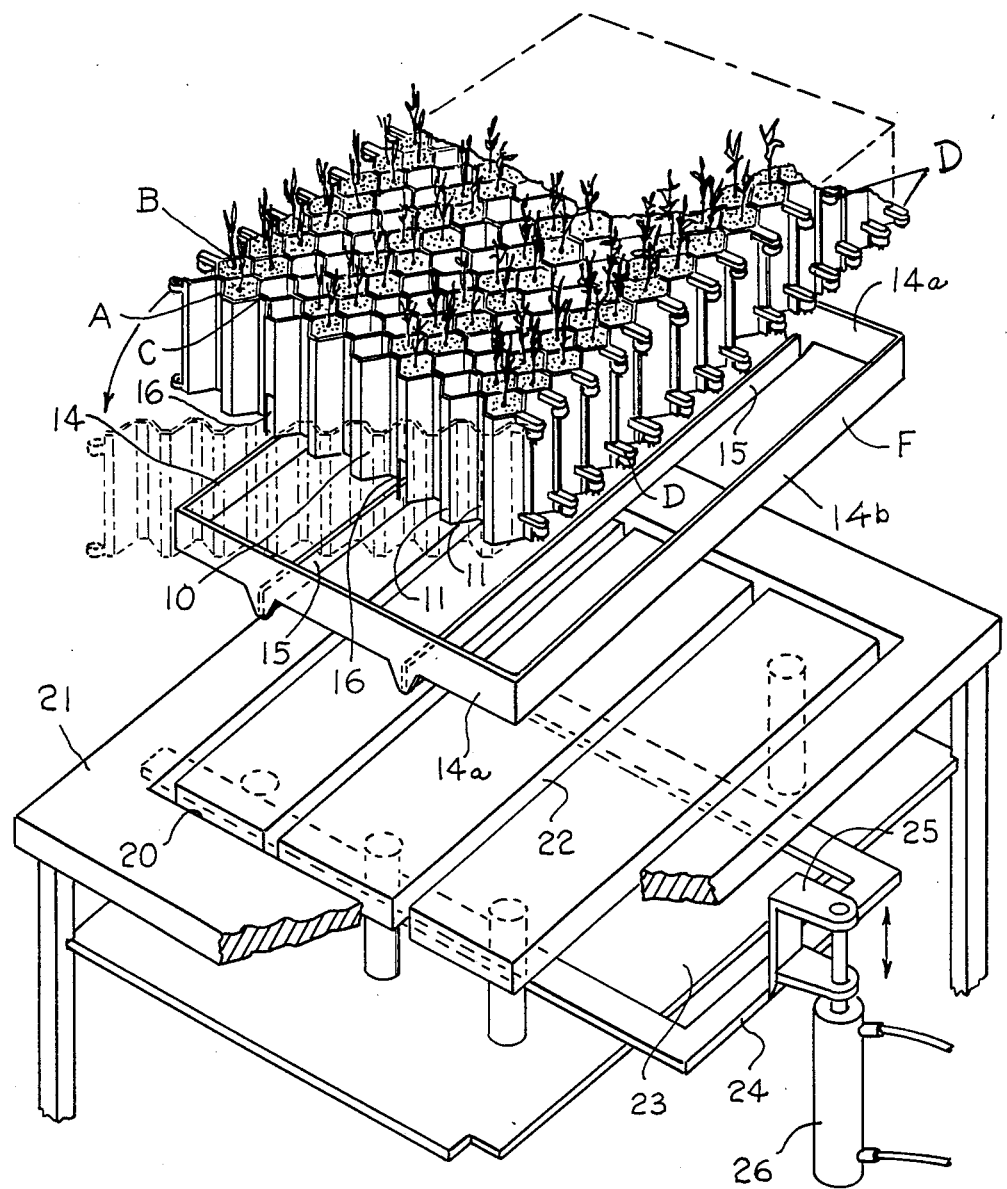
FIG. 3 is a perspective view illustrating a frame for confining and supporting interconnected strips utilized in pairs to form rows of growing compartments together with apparatus including a table facilitating removal of the plants from the trays.

FIGS. 1 through 3 illustrate the use of opposed strips in hinged pairs of strips forming trays best suited to manual operation.

The configuration of the strips of FIGS. 1 through 3 is similar to that of U.S. Pat. No. 4,453,344 wherein openings surround each of the growing compartments being formed from vacant compartments or volumes to permit the flow of air upwardly around the plants while permitting aeration of the root ball with air pruning. The strips are preferably injection molded of plastic and are somewhat flexible being of flat thin walls of generally uniform thickness. However, use of the strips in opposed pairs permits reinforcement against excessive bending when assembled into a growing tray. It will be observed that no plant is bordered by an opening wherein roots may interengage with roots of an adjacent root ball. Each of the strips are generally sinuous barriers having diverging portions 10 together with interconnecting or bridging walls 11 which form flat surfaces and together with opposed flat surfaces of a next adjacent strip form vertical slots which are so narrow as to substantially exclude light while permitting the removal excess moisture as well as the entrance of air for aerating the root ball. The adjacent strips are preferably interconnected and maintained in alignment by interlocking pegs or projections 12 and slots 13 which aid in fastening the strips together into trays.

The injection molded plastic frames F encompass the block of strips forming rows of growing compartments for the plants through the use of a surrounding frame bordering members 14 having end frame members 14a which are bridged side frame members 14b encompassing a plurality of strips forming rows of growing compartments extending about and confining the strips. Intermediate horizontally spaced support members in the form of longitudinal vertically disposed ribs 15 integral with the bordering member extend into the vertical slots 16 forming the lower portions of the strips to provide vertical support from the bottom for the respective strips contained within the frame. No such vertical slots 16 are desirable where the strips are of minimal height since it is convenient to support short strips directly on the tops of the intermediate ribs 15. The support members are spaced below the bordering members to permit the strips to be confined and supported from the bottom.

FIGS. 1 and 2 illustrate the use of a template which has openings in a planer upper surface at E which form patterns permitting entry of growth medium or suitable growing material into predetermined compartments defined between the respective pairs of strips. A border or frame member 17 provides means for assuring registry of openings E within the upper surface of the template with the proper predetermined compartments.

During such filling of the tray with growth medium, the tray is placed on a flat surface, and any excess of growth medium screeded off or otherwise removed. A concave upper surface is placed in the respective filled compartments and the medium compressed by utilizing the usual convex compression means forming a plug or compressed unit of growing medium for containing roots of the plants. The template may be flexible or take the form of any suitable barrier means.

It will be noted in FIG. 2 that in each of the vertical inner surfaces of the strips defining growing compartments, a shelf or ledge 18 extends inwardly over a minor portion of the cross section of the compartment. Considerably less than one-half of the bottom of the growing compartments is covered by the shelves. The shelves or ledges extend outwardly at an acute angle integrally from a lower edge of the walls of the growth compartments forming with the bottoms of the strips a lower planer surface for supporting the growth medium plug. Such shelf or ledge structure sufficiently support from the bottom the growing medium within the respective growing compartments to form root plugs or root balls for the plants. The plugs would have to be sheared away to come through the bottom of the tray. The upper surfaces 18a of the shelves taper inwardly and downwardly at an acute angle to the lower planer surface of the tray.

FIG. 3 illustrates a table wherein an opening slot 20 in the table top 21 forms a border coextensive with the perimeter or bordering member of the trays F while the longitudinal slots 22 permit the tray to be lowered beneath the table upon an intermediate support tray 23 which may be raised or lowered through the support 24 carried by the vertical bracket 25 upon an extensible portion of a fluid operated cylinder 26 for raising and lowering the platform supporting tray 23. When the frame F is lowered, the tray formed by the respective strips is retained upon the table top. The plants may also be removed manually by pivoting the strips one at a time as illustrated in broken lines in FIG. 3 so as to open the respective compartments. Hinges D are carried at each end of the strips.

FIGS. 4-7 illustrate modified forms of the invention especially adapted to mechanized usage in machines for mechanically removing the plants from the compartments.

Figure 4:
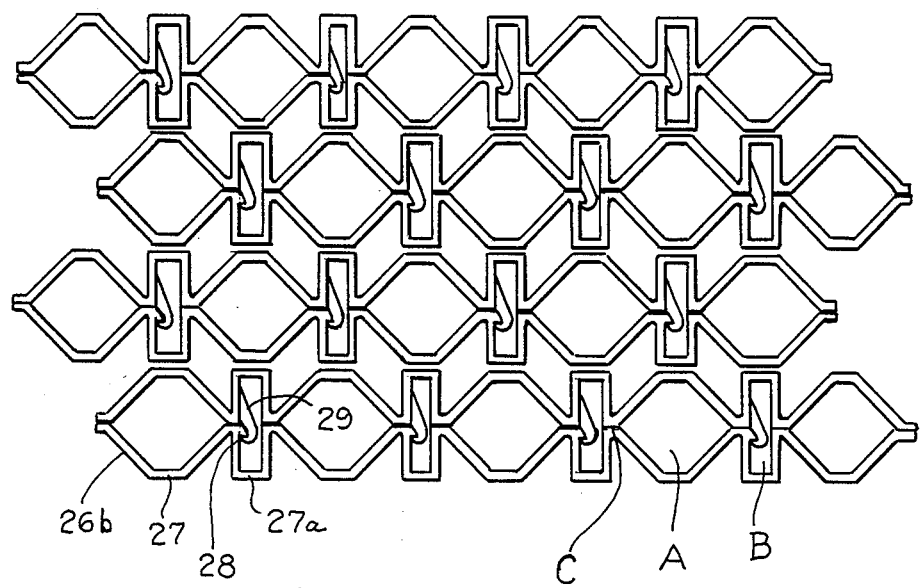
FIG. 4 is a plan view further illustrating an alternate form of strips forming the trays with latches for interconnecting the strips forming compartments.
Figures 5, 5A:
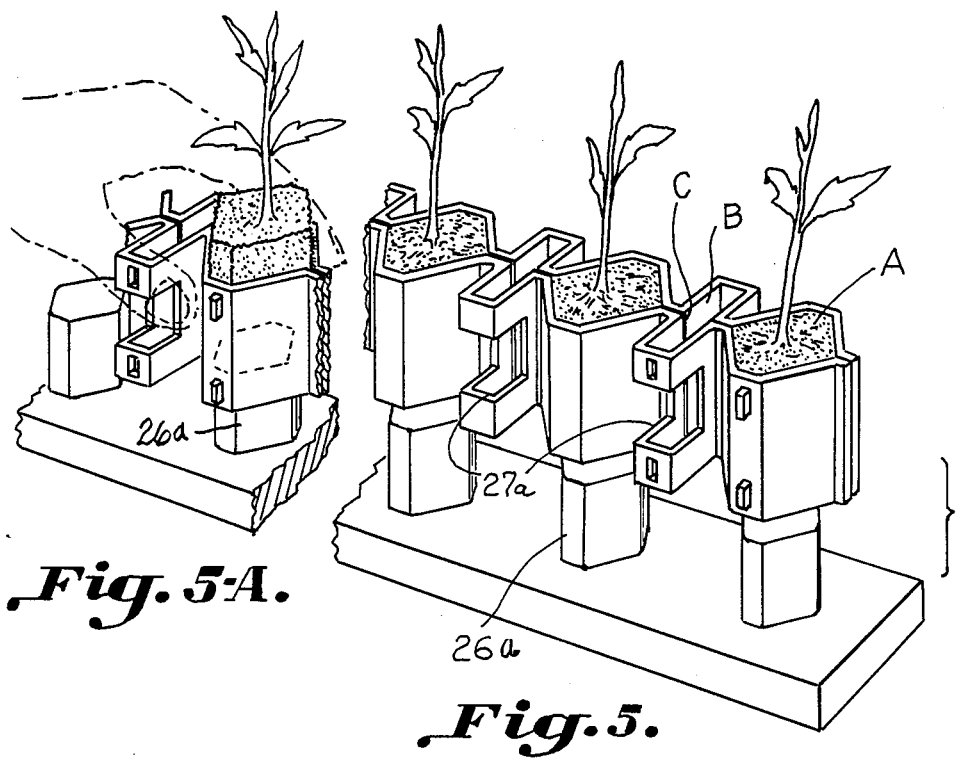
FIG. 5 illustrates removal of rows of plants in series wherein a single row is dislodged from the bottom through insertion of spaced upwardly projecting members, FIG. 5-A is a perspective view similar to FIG. 5 illustrating removal of the plants from the growing compartments.

FIGS. 4 and 5 illustrate a modified form of strips in the form of sinuous barriers which in opposed pairs form the growing compartments. The growing compartments A are separated by interconnecting or bridging walls which form rectangular openings or empty compartments B, and at the same time form the vertical slots C which permit aeration of the root ball. Each of the strips include diverging side members 26 and interconnecting or bridging wall members 27 therebetween. Alternate interconnecting wall members are provided as at 27a in the form of connecting members forming the openings B which together with the adjacent vertical surfaces of the strips form the vertical slots or contact portions C of the strips.

FIG. 5 illustrates the use of windows 27a in the interconnecting members 27 for saving plastic and for supplying more air to the vertical slot C. Such windows may be used in the strips of FIGS. 6 and 7.

The strips are joined together in pairs by latches formed by a vertical projection 28 over which a latching portion 29 passes for securement of the strips in pairs to form rows of compartments as illustrated in FIG. 5.

FIGS. 5 and 5-A illustrate the horizontal movement of a row of plants contained in compartments defined between a pair of opposed strips. The plants are removed by simultaneous pushing from the bottom by the upwardly projecting members 26 with pulling up from the top as by the use of fingers shown in broken lines in FIGS. 5. This action is conveniently adapted to machine operation. The rows of plants may be removed in series in individual rows as illustrated in FIG. 5 and removed through insertion of spaced upwardly projecting members 26a.

Figure 6:
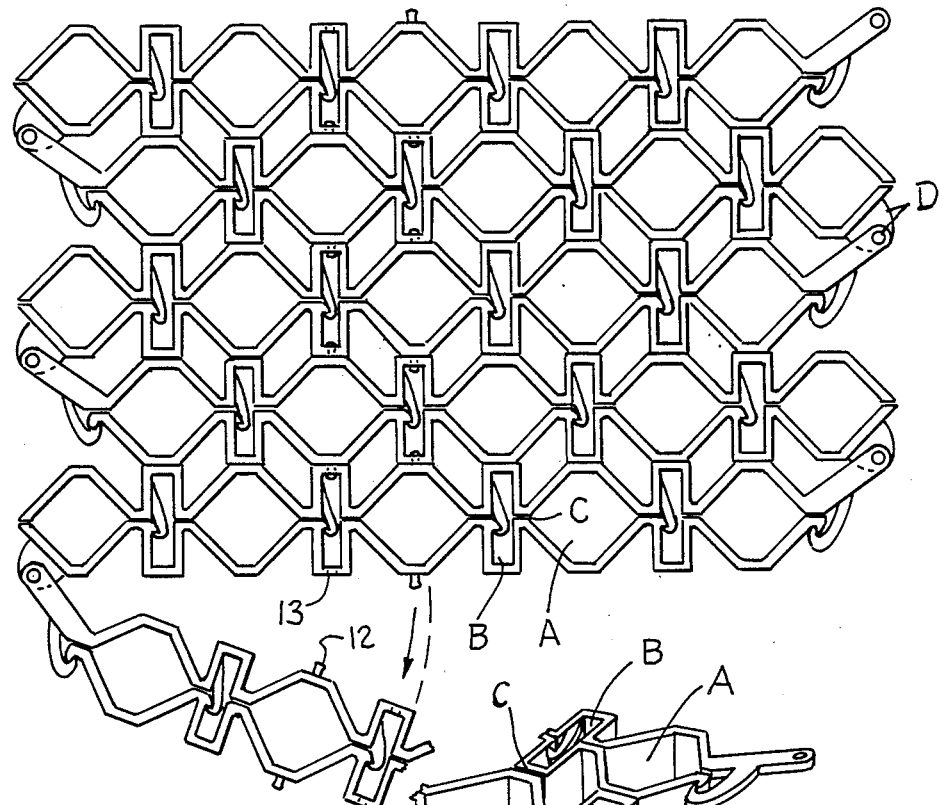
FIG. 6 is a plan view illustrating an alternate form of hinged rows of strips or sinuous barriers with sequential horizontal movement of pairs of strips while supporting them by hinges.
Figure 7:
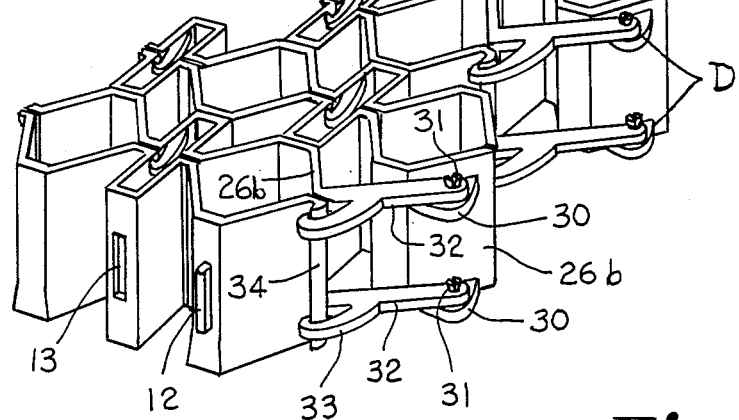
FIG. 7 is a perspective view further illustrating the opposed strips of FIG. 6 forming hinged rows of growing compartments.

FIGS. 6 and 7 illustrate the use of modified strips similar to those of FIGS. 4 and 5 wherein hinges are provided at each end. The hinges are provided through the use of vertical spaced lug portions 30 carried by a marginal diverging wall 26b which carry integral portions 31 which are received within links 32 carried by a diverging wall 26b of an adjacent row formed by opposed strips. A hook portion 33 is carried by the lengths 32 and extend over a vertical catch bar 34 integral with the adjacent row. The use of pegs 12 and slots 13 for receiving the pegs is further illustrated in FIGS. 6 and 7. The pegs serve as means for aligning the strips and aid in holding the strips together to form a tray. Such pegs and slots may be utilized in each of the strips illustrated herein.

In lieu of hinges, the pairs of strips may be integrally connected at each end and because of the limited flexibility afforded by the flat plastic construction, the pairs of strips may simply be flexed open to release the root balls.

Figure 8:
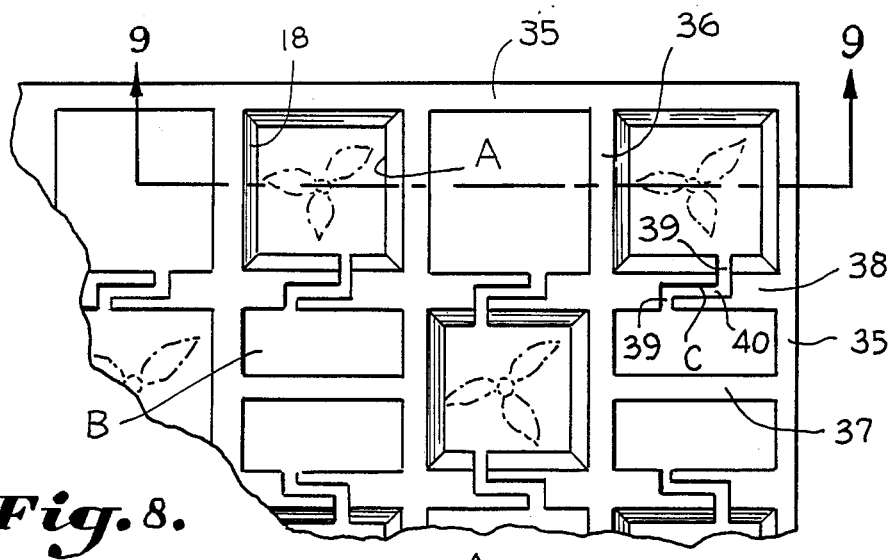
FIG. 8 illustrates another alternate form of the invention wherein an integral tray provides air flow about the growing compartments with aeration and drainage of the root balls, FIG. 9 further illustrates the inwardly extending shelves or ledges at the bottom of the various compartments extending inwardly for a limited distance to form and contain the root balls.
Figure 9:
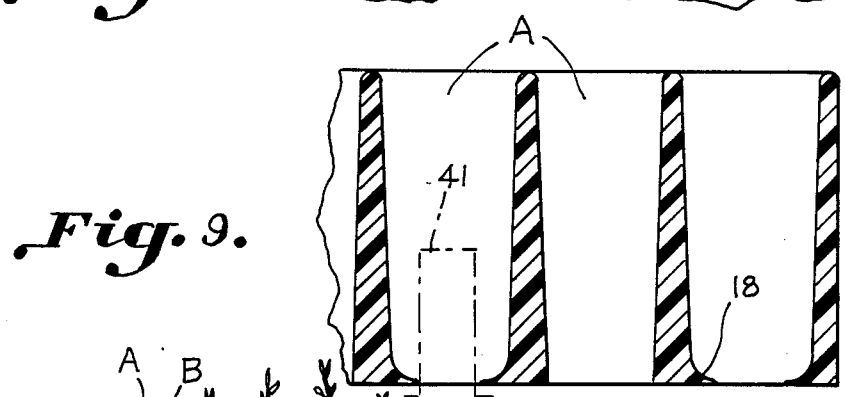
Figure 10:
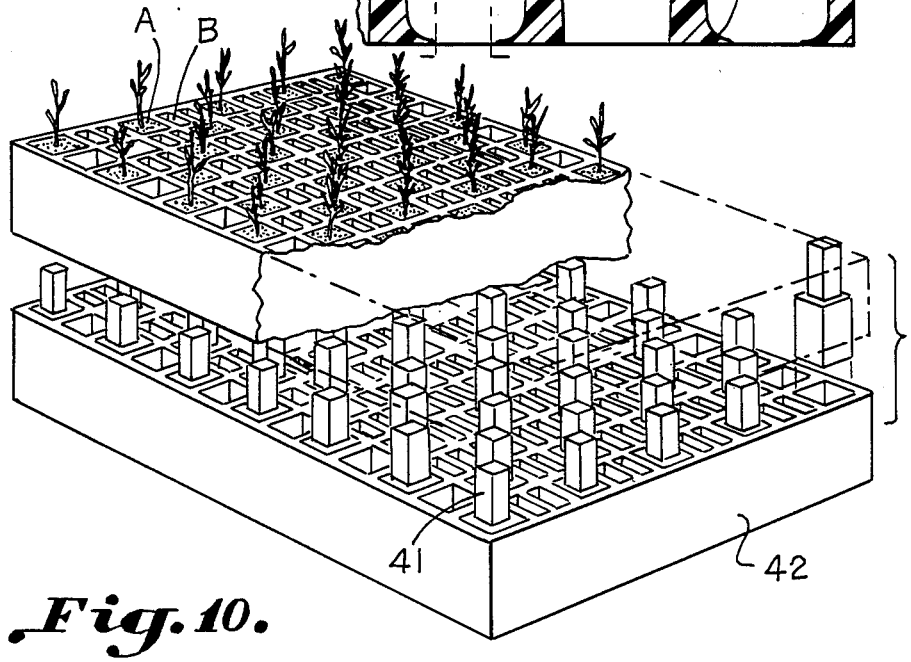
FIG. 10 is a perspective view illustrating dislodgement of the plants of integral trays by upward projections extending from the bottom into the growing compartments.

FIGS. 8, 9 and 10 illustrate an integral growing tray or block.

A bordering strip 35 contains an integrally connected strip extending from frame members 35 as at 36. Alternate openings are formed by strips or bars 37 and a dividing bar or strip 38 contains the vertical slot C as a substantially Z-shaped labyrinth having legs 39 joined with an interconnected vertical slot 40. The vertical slot defined by the labyrinth may simply be provided in the form of a connecting slot extending across the partitions or strips 38.

FIG. 9 further illustrates the use of the shelf members 18 which border the lower edge of each of the growing containers and extend or taper outwardly at an acute angle with the base of the tray.

FIG. 10 illustrates the use of upwardly projecting members 41 which extend entirely across a positioning frame 42. Through this expedient the entire block or plants may be removed at one time from the unitary tray.

Figures 11, 12:
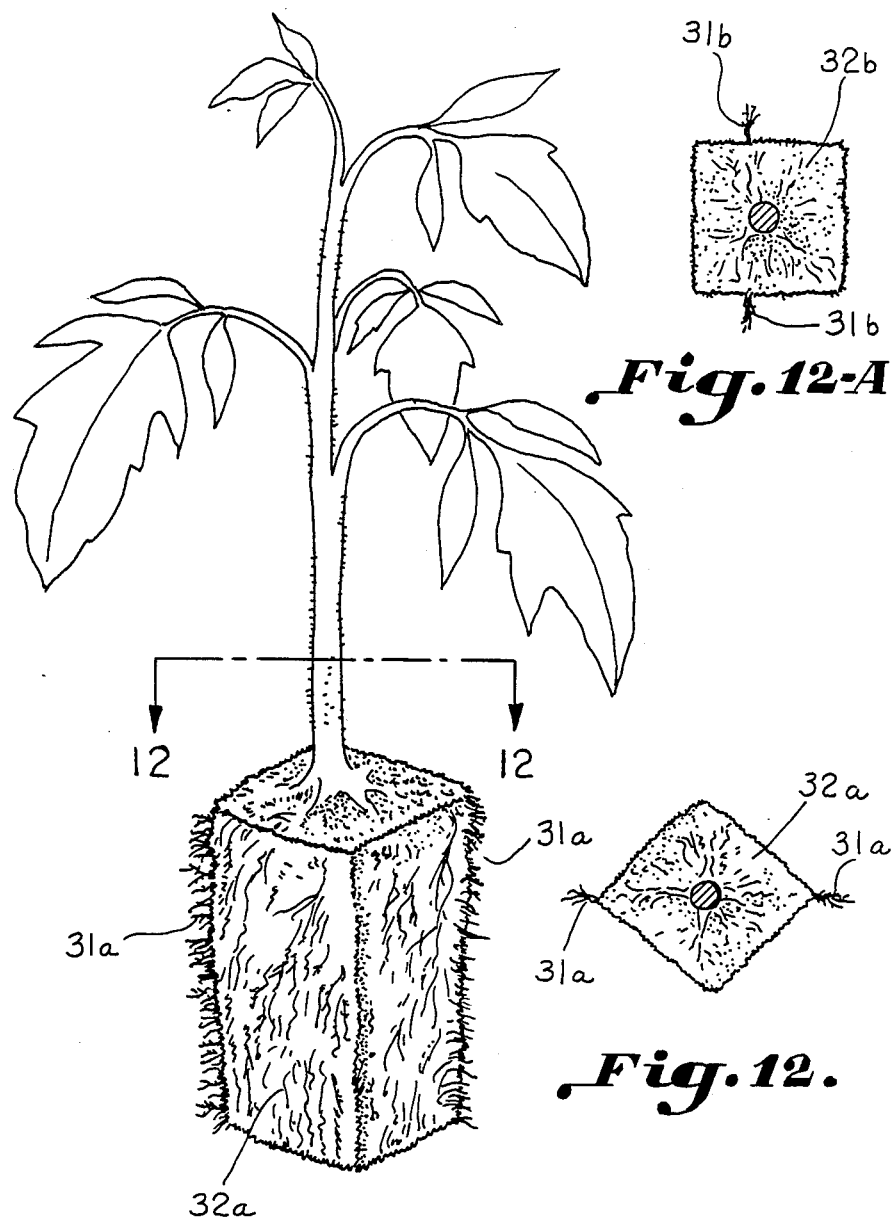
FIG. 11 is a perspective view of a plant of the present invention.
FIG. 12 is a sectional plan view taken on the line 12—12 in FIG. 11, and FIG. 12-A is a sectional plan view illustrating an alternate form of root ball.

FIGS. 11, 12 and 12-A illustrate plants of the present invention grown utilizing the apparatus and method hereof.

It will be observed in FIG. 11 and 12 that the plant has a pair of generally flat root systems 31a extending outwardly from opposed sides of the root plugs in a vertical plane. The systems are illustrated as extending in diametrically opposed relation. The generally flat root systems are grown between closed adjacent flat surfaces such as at C of strips forming growth compartments such as illustrated. It will be observed root systems extend generally throughout and generally downwardly within the growth material as illustrated at 32a in FIGS. 11 and 12. In FIG. 12-A the generally flat root systems are illustrated at 31b, having been grown in an integral tray as illustrated in FIGS. 8–10. The laterally extending root systems 31b appear in opposed relation extending outwardly from the root system contained within the growth medium, having been formed in the openings 39 of the tray.

While a preferred embodiment of the invention has been described using specific terms, such description is for illustrative purposes only, and it is to be understood that changes and variations may be made without departing from the spirit or scope of the following claims.

That which is claimed is:

1. For use in a tray for propagating seedlings and the like utilizing a plurality of elongated strips which form a plurality of rows of growing compartments, a molded plastic frame comprising:

a bordering member encompassing a plurality of strips forming rows of growing compartments extending about and confining said strips therewith; horizontally spaced vertical support members extending across said bordering member and having connection therewith; and said support members being vertically spaced below said bordering member to permit the strips to be placed thereacross to support the strips from the bottom while the strips are confined at their ends within said bordering member; spaced vertical slots within a lower portion of each of said strips for reception of respective support members.

* * * * *